United States Patent
Whalen (10) Patent No.: US 11,142,323 B2
(45) Date of Patent: Oct. 12, 2021

(54) FEATURES TO PREVENT ICE ACCUMULATION ON HEATED FACEPLATE

(71) Applicant: Rosemount Aerospace Inc., Burnsville, MN (US)

(72) Inventor: Mackenzie Whalen, New Prague, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 363 days.

(21) Appl. No.: 16/238,264

(22) Filed: Jan. 2, 2019

(65) Prior Publication Data

US 2019/0210734 A1    Jul. 11, 2019

Related U.S. Application Data (60) Provisional application No. 62/614,116, filed on Jan. 5, 2018.

(51) Int. Cl.
    *B64D 15/00*    (2006.01)
    *G01P 13/02*    (2006.01)

(52) U.S. Cl.
    CPC ............ *B64D 15/00* (2013.01); *G01P 13/025* (2013.01)

(58) Field of Classification Search
    CPC ........ B64D 15/00; B64D 15/12; B64D 15/16; G01P 13/025
    See application file for complete search history.

(56) References Cited

U.S. PATENT DOCUMENTS

| | | | |
|---|---|---|---|
| 3,665,760 A | 5/1972 | Pitches et al. | |
| 5,025,661 A | 6/1991 | McCormack | |
| 5,322,246 A | 6/1994 | Henne et al. | |
| 5,438,865 A | 8/1995 | Greene | |
| 5,466,067 A | 11/1995 | Hagen et al. | |
| 5,628,565 A | 5/1997 | Hagen et al. | |
| 10,393,766 B2 | 8/2019 | Alcaya et al. | |
| 2004/0188945 A1 | 9/2004 | Poincet et al. | |
| 2010/0307442 A1* | 12/2010 | Bolender | F02C 7/047 123/184.56 |
| 2015/0082878 A1 | 3/2015 | Bigand | |
| 2015/0344137 A1 | 12/2015 | Bartz et al. | |
| 2016/0114883 A1* | 4/2016 | Guerry | B81B 7/02 244/200 |
| 2016/0356175 A1 | 12/2016 | Waddington | |
| 2019/0210734 A1 | 7/2019 | Whalen | |

(Continued)

FOREIGN PATENT DOCUMENTS

| CA | 2745138 A1 | 1/2012 |
|---|---|---|
| CN | 105142246 A | 12/2015 |

(Continued)

OTHER PUBLICATIONS

Communication Pursuant to Article 94(3) EPC for European Patent Application No. 18215700.8, dated Jul. 8, 2020, 4 pages.

(Continued)

*Primary Examiner* — Richard G Davis
(74) *Attorney, Agent, or Firm* — Kinney & Lange, P.A.

(57) ABSTRACT

A wall for a heated faceplate includes a base and tines protruding from the base and spaced from each another. The tines are configured to accumulate ice in a manner which promotes shedding of small ice formations to prevent large accumulations of ice father aft on the faceplate.

18 Claims, 9 Drawing Sheets

(56) References Cited

U.S. PATENT DOCUMENTS

2019/0242924 A1  8/2019  Lang et al.
2019/0346478 A1  11/2019  Reid et al.
2019/0346479 A1  11/2019  Reid

FOREIGN PATENT DOCUMENTS

| | | |
|---|---|---|
| CN | 107687350 A | 2/2018 |
| CN | 107843249 A | 3/2018 |
| DE | 102008007469 A1 | 8/2009 |
| EP | 1844863 A1 | 10/2007 |
| EP | 2950106 A1 | 12/2015 |
| EP | 2980589 A1 | 2/2016 |
| EP | 3012187 A1 | 4/2016 |
| EP | 3056884 A1 | 8/2016 |
| EP | 3413025 A1 | 12/2018 |
| EP | 3567376 A1 | 11/2019 |
| WO | WO03087847 A1 | 10/2003 |

OTHER PUBLICATIONS

Extended European Search Report for European Patent Application No. 18215700.8 dated May 20, 2019, 9 pages.
Extended European Search Report for European Patent Application No. 19173361.7, dated Sep. 11, 2019, 11 pages.
Extended European Search Report for European Patent Application No. 19173355.9, dated Sep. 11, 2019, 12 pages.

\* cited by examiner

FEATURES TO PREVENT ICE ACCUMULATION ON HEATED FACEPLATE

CROSS-REFERENCE TO RELATED APPLICATION(S)

This application claims the benefit of U.S. Provisional Application No. 62/614,116 filed Jan. 5, 2018 for "FEATURES TO PREVENT ICE ACCUMULATION ON HEATED FACEPLATE" by Mackenzie Whalen, which is fully incorporated by reference herein.

BACKGROUND

The present disclosure relates generally to faceplates, and in particular, to icing of faceplates.

Sensors are mounted on aircraft to gather information about the aircraft. Some sensors have faceplates positioned adjacent the surface of the aircraft and exposed to the oncoming airflow exterior to the aircraft. The environment exterior to the aircraft is often cold, and the oncoming airflow may contain water particles that collect on the surface of the aircraft. The water on the surface of the aircraft can freeze onto an adjacent faceplate and accumulate as a large ice formation. Large ice formations on a faceplate can obstruct airflow and interfere with the sensor associated with the faceplate.

SUMMARY

A wall for a heated faceplate includes a base and tines protruding from the base and spaced from each another. The tines are configured to accumulate ice.

A faceplate includes an upstream portion, a downstream portion adjacent the upstream portion, and a wall at the upstream portion of the faceplate. The wall includes a base connected to the exterior surface of the faceplate at the upstream portion of the faceplate and tines protruding from the base. The tines are substantially parallel to oncoming airflow.

A method for preventing significant ice accumulation on a heated faceplate including accumulating ice fragments on tines protruding from a base of a wall positioned on an upstream portion of the faceplate and shedding the ice fragments from the tines.

DETAILED DESCRIPTION

In general, the present disclosure describes a heated faceplate that includes a wall on an upstream portion of the faceplate. The wall has tines on which ice accretes in small, unstable shapes such that the ice sheds before becoming large enough to significantly obstruct airflow. As a result, the wall eliminates water moving from the surface of the aircraft to a downstream portion of the faceplate so that the water does not freeze onto the faceplate and accumulate as a large ice formation, which could obstruct airflow and interfere with a sensor associated with the faceplate. As such, the tines accumulate ice in a manner that promotes shedding of small ice formations to prevent large accumulations of ice farther aft on the faceplate.

Figure 1:
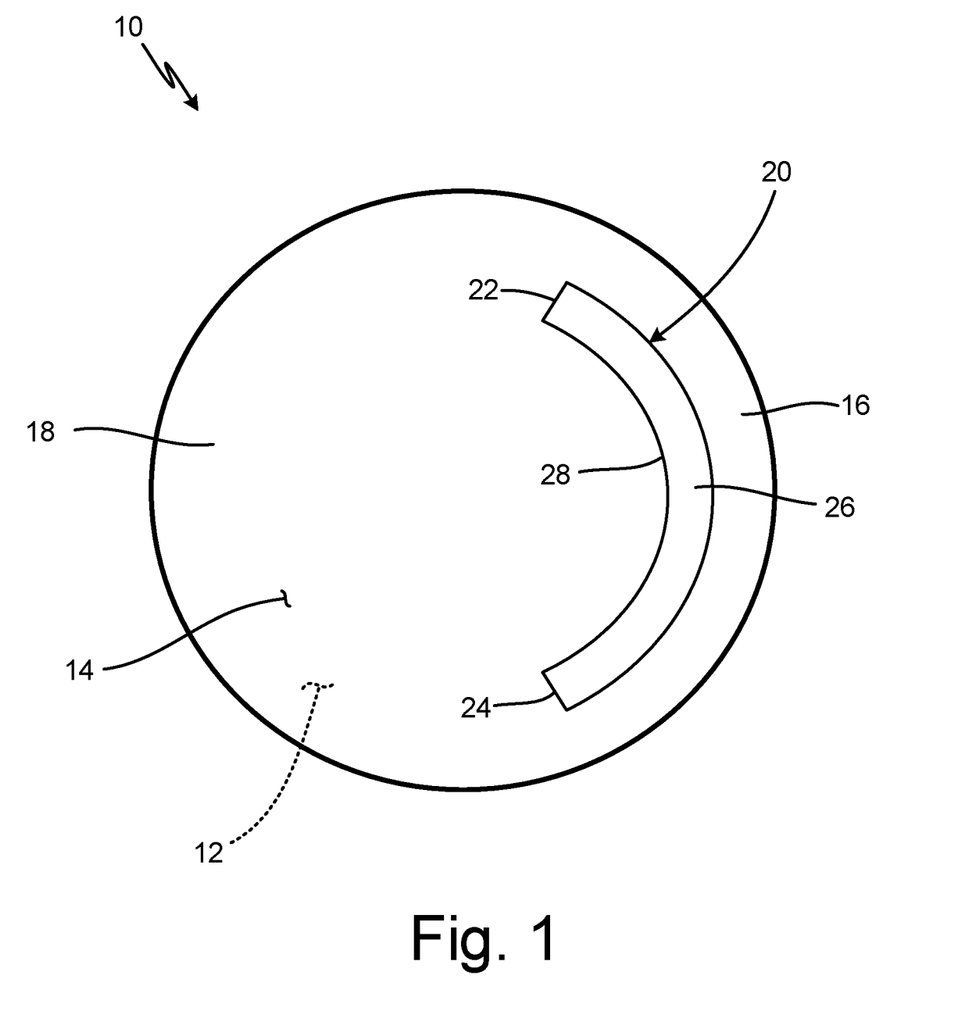
FIG. 1 is a schematic view of a faceplate with a wall.

FIG. 1 is a schematic view of faceplate 10 with wall 20. Faceplate 10 includes interior surface 12, exterior surface 14, upstream portion 16, downstream portion 18, and wall 20. Wall 20 includes first end 22, second end 24, upstream side 26, and downstream side 28.

Faceplate 10 is associated with a sensor installed on an aircraft, and is a heated faceplate. Faceplate 10 may be a faceplate of an angle of attack sensor, a flush static plate, or any other suitable sensor. When the sensor is installed on an aircraft, faceplate 10 may be about flush with the surface, or skin, of the aircraft. Faceplate 10 may be round, rectangular, or any other suitable shape. Interior surface 12 is the surface of faceplate 10 that faces toward an interior of an aircraft. Exterior surface 14 is the surface opposite interior surface 12 of faceplate 10, or the surface of faceplate 10 that faces toward the environment exterior to an aircraft. Exterior surface 14 may be about flush with the exterior surface, or skin, of an aircraft. Upstream portion 16 is a portion of faceplate 10 that is upstream with respect to oncoming airflow when faceplate 10 is installed on an aircraft. Downstream portion 18 is a portion of faceplate 10 that is downstream from upstream portion 16 (and downstream with respect to oncoming airflow) when faceplate 10 is installed on an aircraft. Downstream portion 18 is adjacent upstream portion 16.

Wall 20 is at upstream portion 16 of faceplate 10. Wall 20 may be next to, or in line with, an upstream edge of faceplate 10 or set back from an upstream edge of faceplate 10. Wall 20 can be machined into faceplate 10 such that wall 20 is integral, or unitary, with faceplate 10. Wall 20 can also be formed separately and attached to upstream portion 16 of faceplate 10. In this embodiment, wall 20 is made of aluminum. In alternate embodiments, wall 20 may be made of any suitable material or combinations of materials. First end 22 is at a first end of wall 20, and second end 24 is at a second end of wall 20. Upstream side 26 extends from first end 22 to second end 24. Downstream side 28 extends from first end 22 to second end 24 and is opposite from upstream side 26. Upstream side 26 is upstream from downstream side 28.

The sensor associated with faceplate 10 is installed on an aircraft. Water from the surface of the aircraft adjacent upstream portion 16 of faceplate 10 freezes on wall 20, and ice accumulates on wall 20 as small, unstable ice fragments. The ice fragments shed from wall 20 into the oncoming airflow. Ice shedding from wall 20 is consistent and predictable such that ice does not accumulate into large formations. The ice fragments that shed from wall 20 move downstream and have an abrasive effect on downstream portion 18 of faceplate 10 as they impact or bounce off of downstream portion 18, removing any ice accumulation on the faceplate downstream of wall 20 from any water that made it past wall 20.

A significant amount of ice can accumulate on a faceplate due to high water content on the surface of the aircraft adjacent the faceplate. The water on the surface of the aircraft can run onto the adjacent faceplate and freeze, or turn to ice, on a cold portion of the surface of the faceplate. The ice can accumulate into a large ice formation. Significant ice accumulation can also occur on a heated faceplate when ice on or near a heated surface of the faceplate melts into water, runs back to a cold surface of the faceplate, and freezes on the faceplate. Significant ice accumulation can obstruct local airflow and interfere with the accuracy of a sensor associated with the faceplate. For example, ice accumulation on the faceplate of an angle of attack sensor can significantly deflect the angle of attack vane that extends out from the faceplate and aligns itself to the local airflow, resulting in inaccurate angle of attack measurements.

Wall 20 collects and removes water from the surface of the aircraft adjacent faceplate 10 at upstream portion 16 of faceplate 10. The ice fragments that form on wall 20 are small enough that, as they accumulate and shed, the ice fragments do not significantly interfere with oncoming airflow, or interfere with sensor measurement. For example, when faceplate 10 is part of an angle of attack sensor, the ice fragments accumulating on and shedding from wall 20 do not deflect the angle of attack vane and interfere with angle of attack measurements. Wall 20 also removes ice from downstream portion 18 of faceplate 10. As such, wall 20 prevents water from the aircraft surface from running onto the faceplate and accumulating onto faceplate 10 as a large ice formation that would significantly obstruct airflow. Thus, faceplate 10 and a sensor associated with faceplate 10 can withstand icing environments.

Figure 2A:
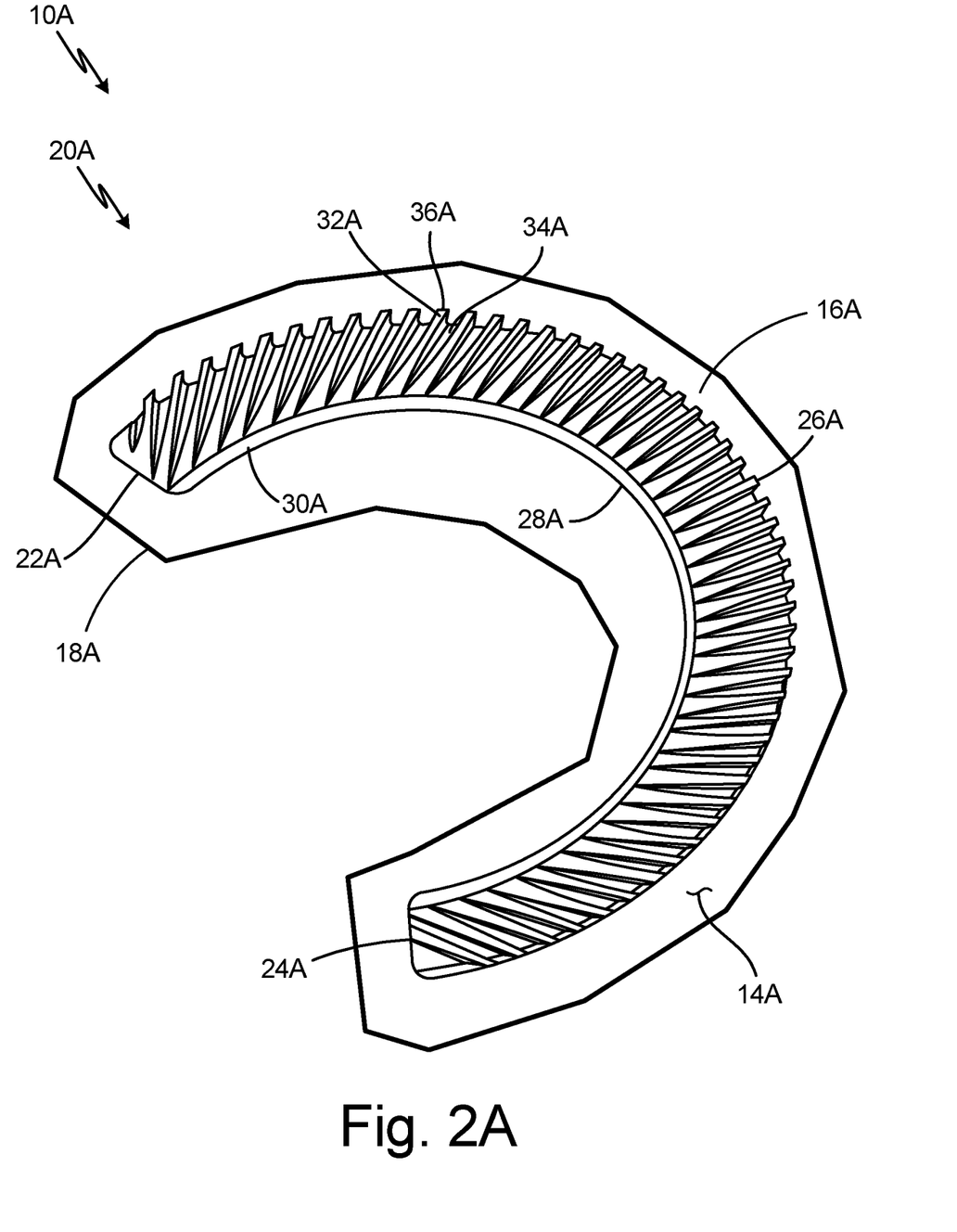
FIG. 2A is a partial perspective view of a wall as an integral part of the faceplate.
Figure 2B:
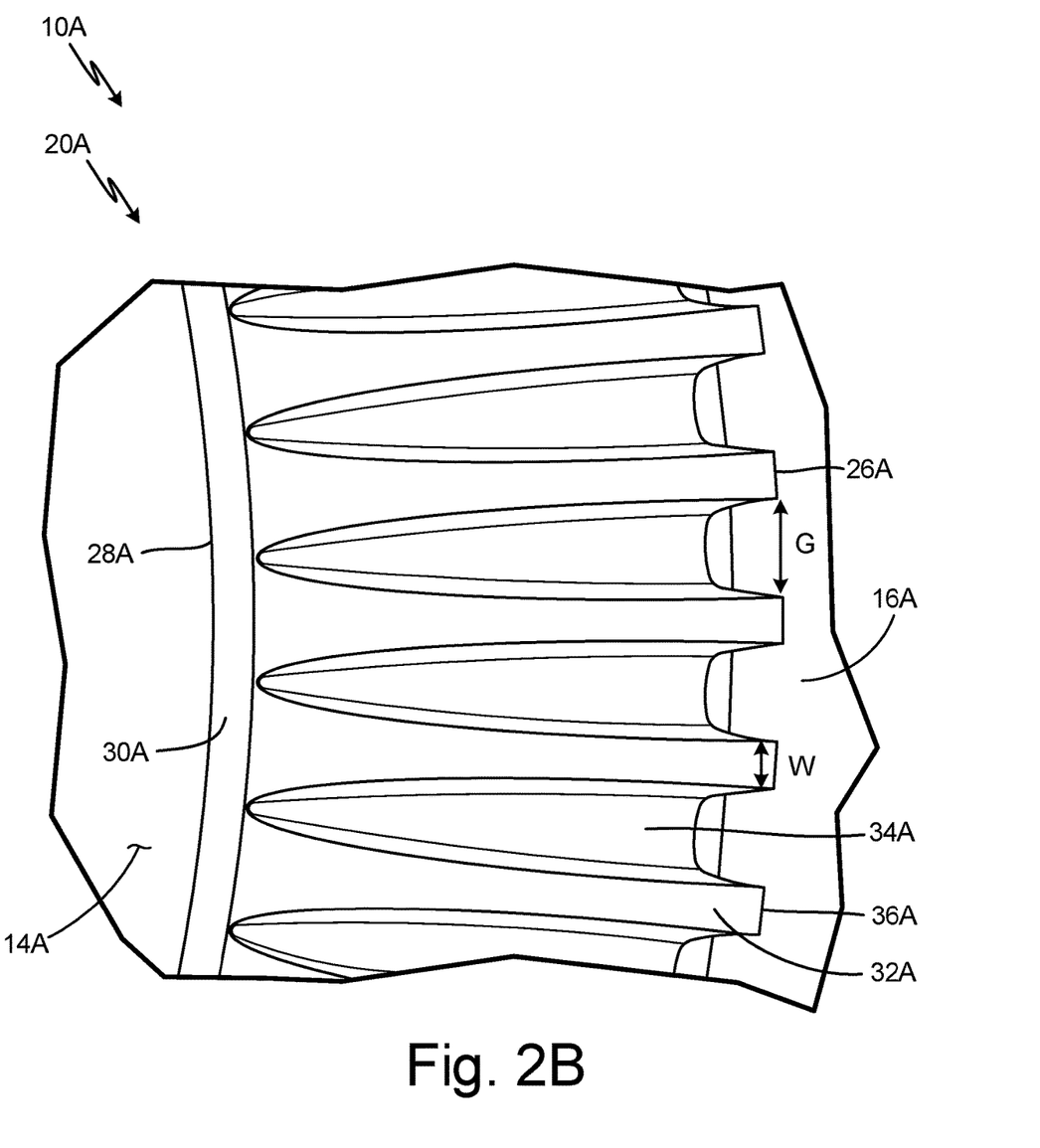
FIG. 2B is an enlarged partial top view of the wall as an integral part of the faceplate.
Figure 2C:
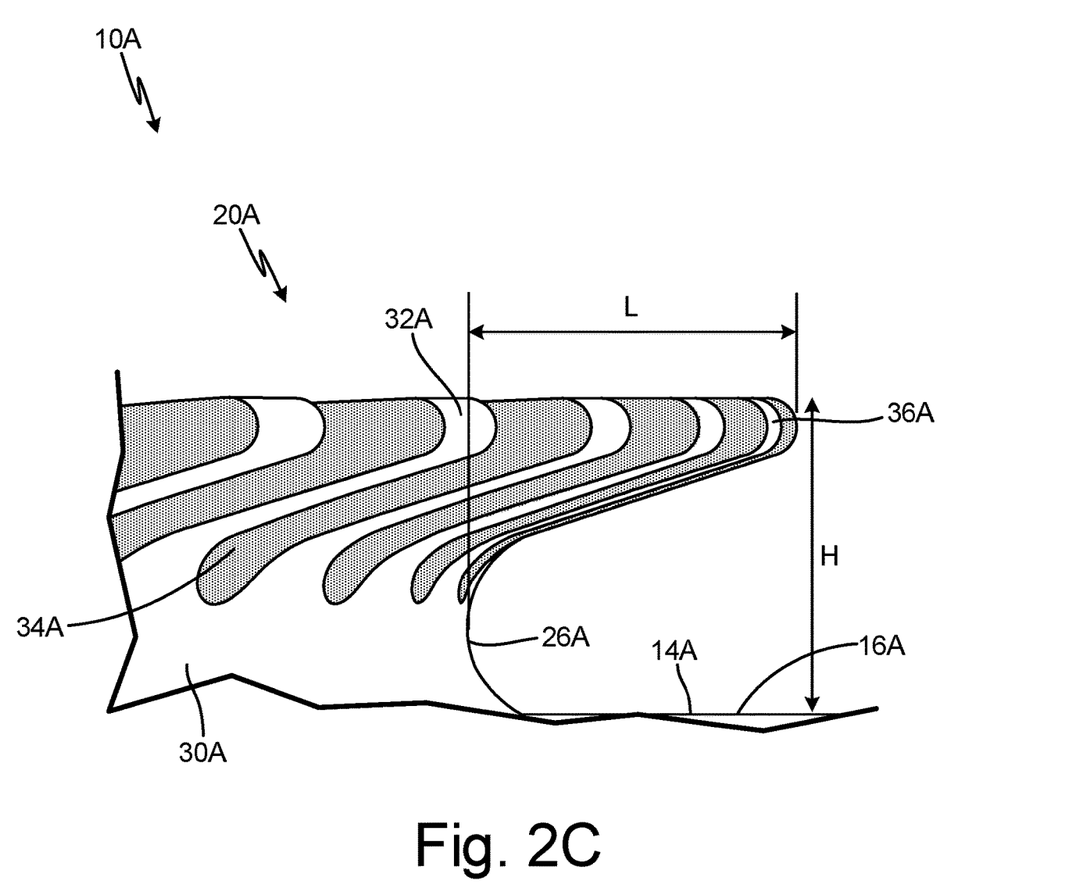
FIG. 2C is an enlarged partial perspective side view of the wall as an integral part of the faceplate.

FIG. 2A is a partial perspective view of wall 20A as an integral part of faceplate 10A. FIG. 2B is an enlarged partial top view of wall 20A as an integral part of faceplate 10A. FIG. 2C is an enlarged partial perspective side view of wall 20A as an integral part of faceplate 10A. FIGS. 2A, 2B, and 2C will be discussed together. Faceplate 10A includes exterior surface 14A, upstream portion 16A, and downstream portion 18A (shown in FIG. 2A). Wall 20A includes first end 22A (shown in FIG. 2A), second end 24A (shown in FIG. 2A), upstream side 26A, downstream side 28A (shown in FIGS. 2A and 2B), base 30A, tines 32A, and grooves 34A. Tines 32A have edges 36A. Also shown in FIG. 2B is width W of tines 32A and width G of grooves 34A. Also shown in FIG. 2C is height H of tines 32A and overhang length L of tines 32A.

Faceplate 10A is the same as faceplate 10 described in reference to FIG. 1. Wall 20A is also the same as wall 20 described in reference to FIG. 1. However, in this embodiment, wall 20A is integral to, or unitary with, upstream portion 16A of faceplate 10A. In alternate embodiments, wall 20A may be a separate part that is attached to faceplate 10A. Further, in this embodiment, wall 20A is a horse-shoe shape. In alternate embodiments, wall 20A may be any suitable shape.

Wall 20A is horse-shoe shaped. As such, upstream side 26A has a horse-shoe shape, and downstream side 28B has a horse-shoe shape. Wall 20A is a horse-shoe shape such that wall 20A may extend around a vane when, for example, faceplate 10A is a faceplate of an angle of attack sensor. Base 30A of wall 20A is connected to exterior surface 14A at upstream portion 16A of faceplate 10A. As such, a bottom of base 30A is flush with the surface, or skin, of the aircraft on which faceplate 10A is installed. Base 30A extends from first end 22A to second end 24A of wall 20A and from upstream side 26A to downstream side 28A of wall 20A. Wall 20A has a series of tines 32A positioned between first end 22A and second end 22A. Tines 32A protrude out and away from base 30A. As such, tines 32A extend from downstream side 28A to upstream side 26A at an angle. Tines 32A protrude out of a top of base 30A away from the surface of an aircraft and in an upstream direction such that tines 32A are substantially parallel to oncoming airflow. As such, tines 32A overhang base 30A in an upstream direction. Tines 32A have overhang length L (shown in FIG. 2C), which is the length of each tine 32A that extends past base 30A in an upstream direction. In alternate embodiments, tines 32A do not overhang base 30A and tines 32A are normal to faceplate 10A. Thus, overhang length L may be between about 0 and about 0.25 inch (0.635 centimeter). Tines 32A have height H (shown in FIG. 2C), which is the distance between exterior surface 14A of faceplate 10A and a top of tine 32A. Height H may be between about 0.080 inch (0.203 centimeter) and about 0.375 inch (0.953 centimeter). Tines 32A have a small width W (shown in FIG. 2B), or the distance between a first side of tine 32A and a second side of tine 32A. Width W is large enough to capture a large percentage of water that is flowing along a surface of the aircraft adjacent faceplate 10A and small enough that the contact area for ice growth on tines 32A creates unstable shapes. In this embodiment, each tine 32A has the same width W. In alternate embodiments, tines 32A may have varying widths.

Tines 32A are spaced from each other by grooves 34A positioned between tines 32A. As such, width W of each tine 32A is also the distance between two adjacent grooves 34A. Grooves 34A have width G (shown in FIG. 2B), or the distance between a first side of groove 34A and a second side of groove 34A. Width G of grooves 34A is also the distance between two adjacent tines 32A. In this embodiment, width W of tines 32A is smaller than width G of grooves 34A. Grooves 34A may be any suitable shape. In this embodiment, grooves 34A are the same shape. In alternate embodiments, grooves 34A may be varying shapes.

Each tine 32A has an edge 36A, which is the upstream end of each tine 32A. Height H of tines 32A is the distance between exterior surface 14A of faceplate 10A and a top of edge 36A. In this embodiment, edges 36A of tines 32A are rounded. Edges 36A have as small a radius as possible to decrease the surface areas of edges 36A, thereby decreasing the areas of contact for ice formation. In alternate embodiments, edges 36A may be sharp, or pointed. Base 30A and tines 32A, including edges 36A, make up the upstream side 26A of wall 20A.

The sensor, such as an angle of attack sensor, associated with faceplate 10A is installed on an aircraft. Water from the surface of the aircraft adjacent faceplate 10A contacts wall 20A. More specifically, water within height H of tines 32A may contact wall 20A. As such, tines 32A are of a height H that will be effective given the water content on the surface of the aircraft and the boundary layer profile. The water collects on wall 20A as it freezes into ice with unstable shapes on tines 32A. Width W of tines 32A is small so that ice accumulates on tines 32A as small, aerodynamically unstable ice fragments. Edges 36A have small contact areas for ice formation to increase the instability of any ice that forms on edges 36A. Overhang length L of tines 32A contributes to the instability of ice fragments that form on tines 32A. Tines 32A prevent water or ice from contacting exterior surface 14A of faceplate 10A and freezing onto exterior surface 14A as a large, stable ice formation. Height H is large enough to capture water from the surface of the aircraft adjacent faceplate 10A but small enough that water can be frozen and quickly shredded before ice forms down to the exterior surface 14A of faceplate 10A. Adjacent tines 32A are separated from each other by grooves 34A to prevent bridging of ice fragments between tines 32A. As such, ice fragments on tines 32A are unable to connect and become a stronger ice formation. The ice fragments consistently and predictably shed from tines 32A before forming a large ice shape. More specifically, overhang length L increases the impact pressure of oncoming airflow on the unstable ice fragments that have formed on tines 32A, causing ice fragments to shed, or break away, from tines 32A. As such, overhang length L is large enough to enable ice fragments to shed but small enough that water does not contact faceplate 10A. In embodiments where overhang length L is zero, ice accumulation on tines 32A is less likely to contact exterior surface 14A of faceplate 10A. The ice fragments that shed from tines 32A move downstream and abrade any ice that has formed on downstream portion 18A of faceplate 10A as they impact or bounce off of downstream portion 18A of faceplate 10A.

Because wall 20A is horse-shoe shaped, and thus can extend around a vane, wall 20A can accommodate a faceplate for an angle of attack sensor, or any other suitable sensor having a vane. Wall 20A collects and eliminates the water from the surface of the aircraft adjacent faceplate 10A that would otherwise impinge and runback on faceplate 10A. Moreover, wall 20A removes ice accumulation on downstream portion 18A of faceplate 10A. Thus, faceplate 10A, and the sensor associated with faceplate 10A, can withstand icing conditions.

Figure 3:
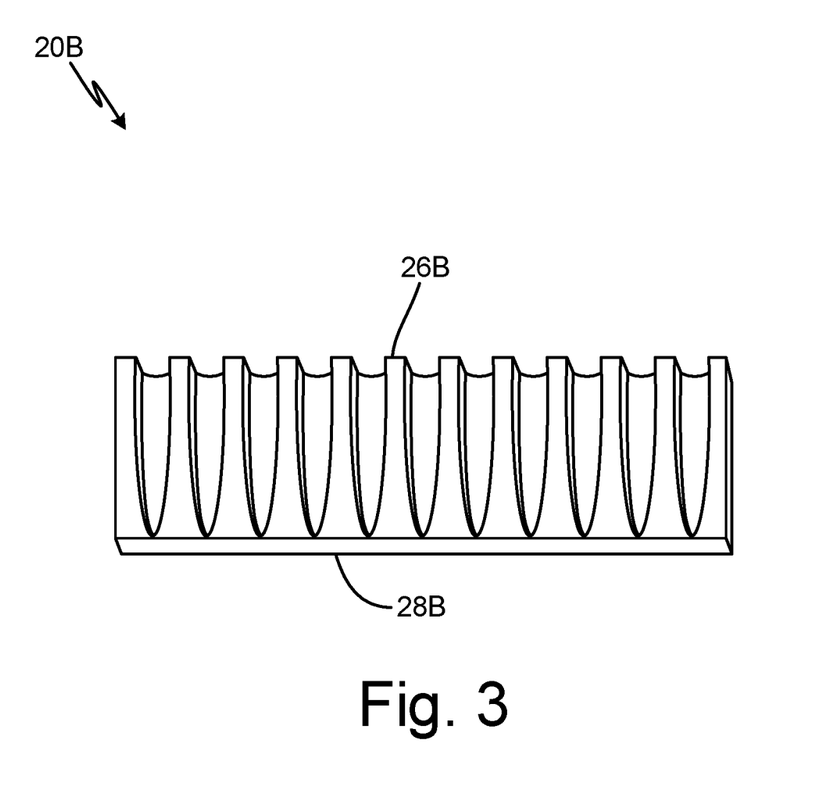
FIG. 3 is a perspective view of a straight wall.

FIG. 3 is a perspective view of straight wall 20B. Wall 20B includes upstream side 26B and downstream side 28B.

Wall 20B is the same as walls 20 and 20A described in reference to FIGS. 1-2C. However, wall 20B is straight. As such, upstream side 26B is straight, and downstream side 28B is straight. Wall 20B is straight such that wall 20B may be positioned adjacent a straight edge of a faceplate. Wall 20B may also be positioned on a faceplate requiring straight wall 20B due to the configuration of the sensor associated with the faceplate or the airflow characteristics. Thus, Wall 20B can accommodate a faceplate associated with a flush static plate, or any other suitable sensor having a faceplate with a straight edge, as well as an array of other faceplates associated with sensors having various configurations. Wall 20B can also accommodate faceplates on sensors subject to various environmental conditions.

Figure 4:
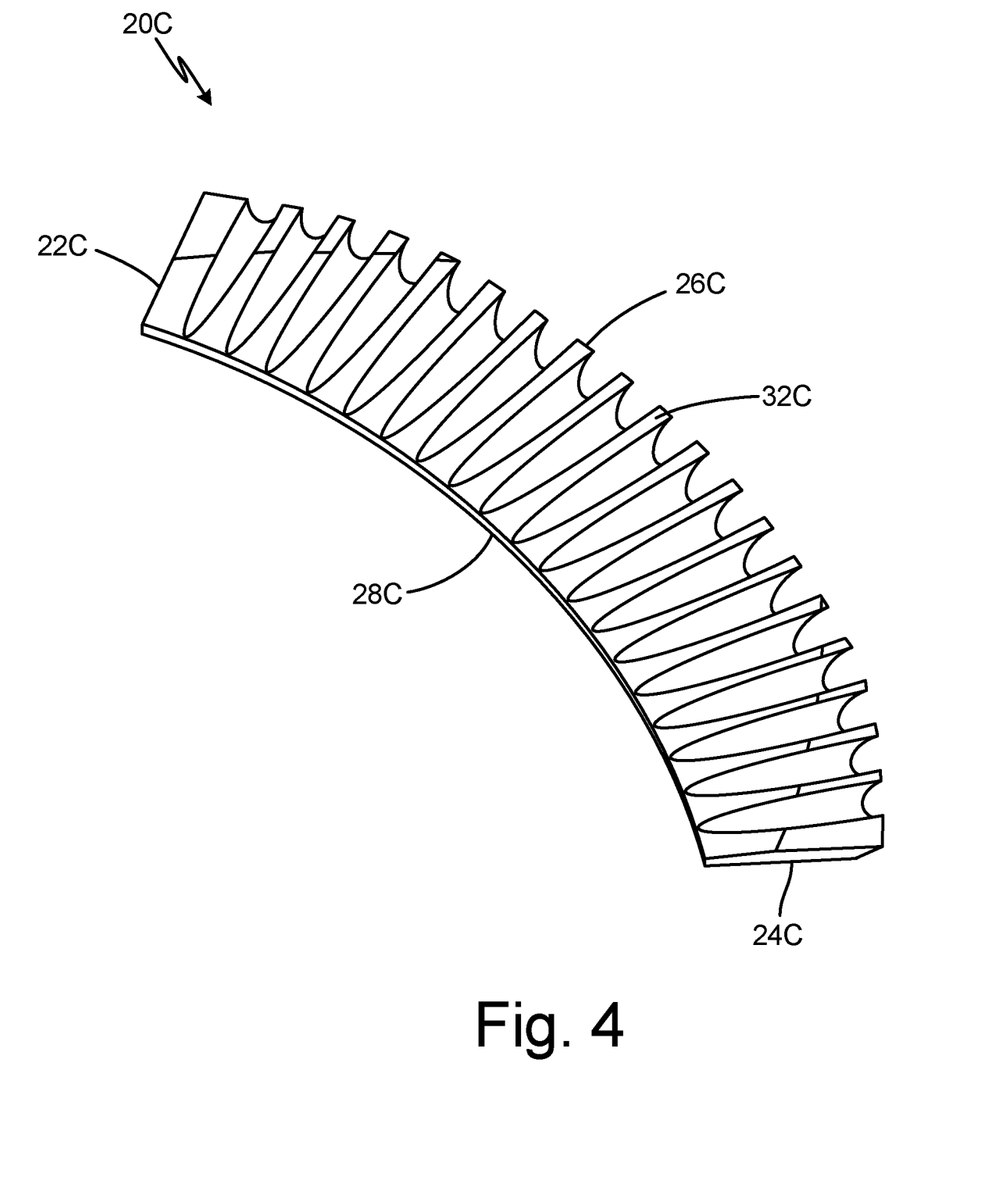
FIG. 4 is a perspective view of a curved wall.

FIG. 4 is a perspective view of curved wall 20C. Wall 20C includes first end 22C, second end 24C, upstream side 26C and downstream side 28C, and tines 32C.

Wall 20C is the same as walls 20 and 20A described in reference to FIGS. 1-2C. However, wall 20C is curved and tines 32C adjacent first end 22C and second end 24C are tapered. As such, upstream side 26C is curved, and downstream side 28C is curved. Wall 20C is curved such that wall 20C may be positioned adjacent a curved edge of a faceplate. Wall 20C may also be positioned on a faceplate requiring curved wall 20C due to the configuration of the sensor associated with the faceplate or the airflow characteristics. Tines 32C adjacent first end 22C and tines 32C adjacent second end 24C are tapered to accommodate varying sensor configurations and airflow characteristics. Thus, wall 20C can accommodate a faceplate having a curved edge as well as other faceplates associated with various sensors. Wall 20C can also accommodate faceplates on sensors subject to various environmental conditions.

Figure 5A:
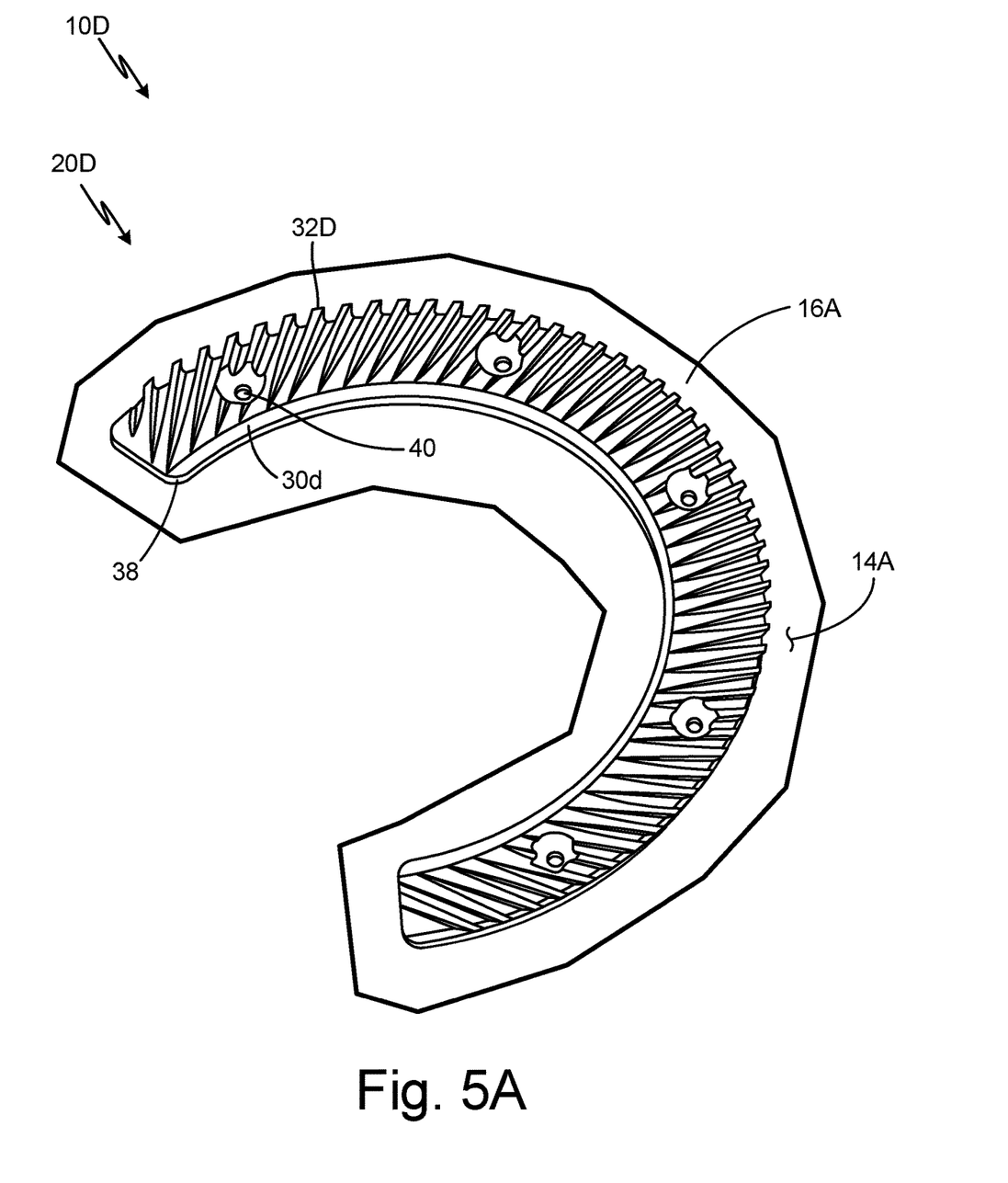
FIG. 5A is a partial perspective view of a wall as a separate part of the faceplate.
Figure 5B:
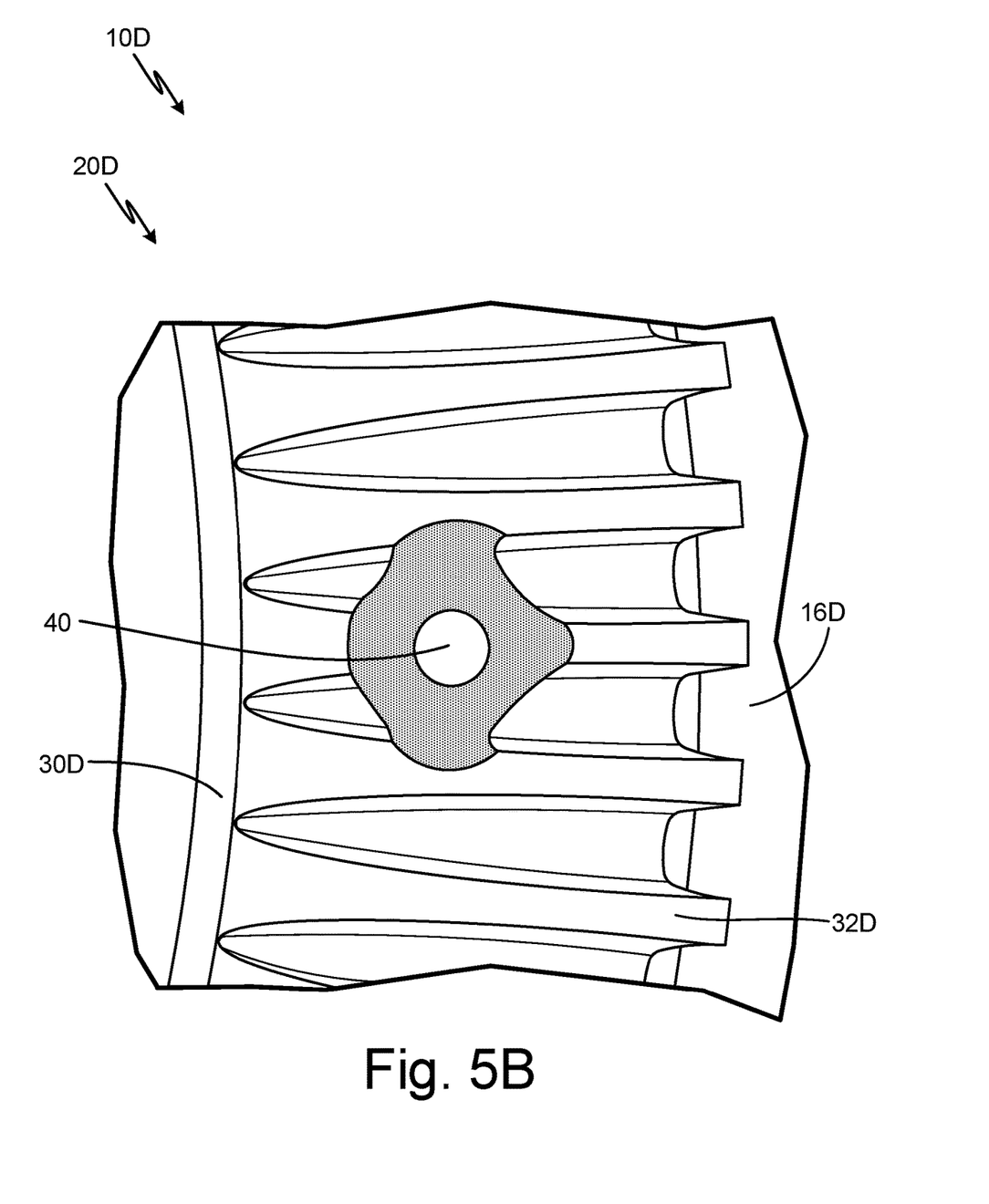
FIG. 5B is an enlarged partial top view of the wall as a separate part of the faceplate.
Figure 5C:
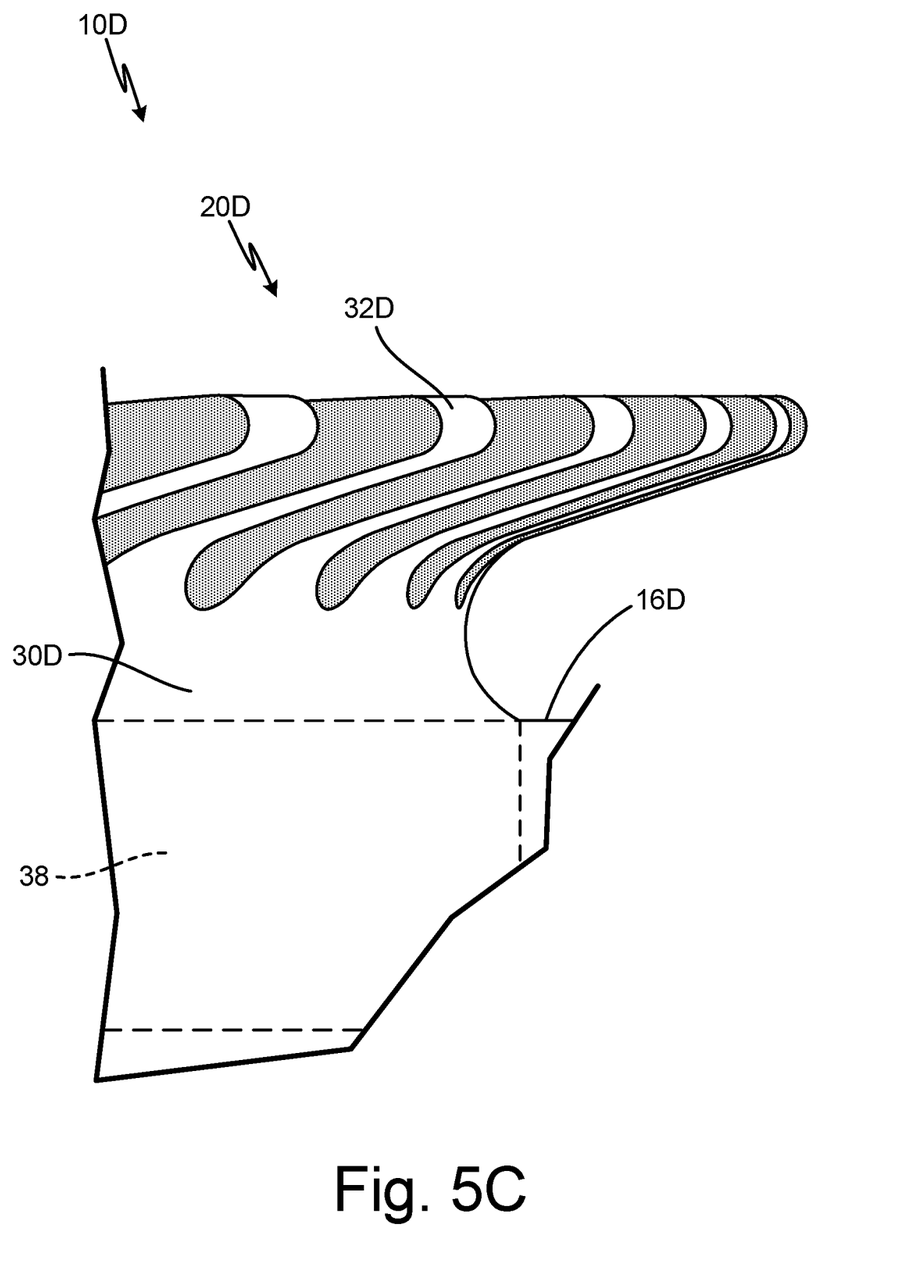
FIG. 5C is an enlarged partial perspective side view of the wall as a separate part of the faceplate.

FIG. 5A is a partial perspective view of wall 20D as a separate part of faceplate 10D. FIG. 5B is an enlarged partial top view of wall 20D as a separate part of faceplate 10D. FIG. 5C is an enlarged partial perspective side view of wall 20D as a separate part of the faceplate 10D. FIGS. 5A, 5B, and 5C will be discussed together. Faceplate 10D includes upstream portion 16D and wall 20D. Wall 20D includes base 30D, tines 32D, mounting base 38 (shown in FIGS. 5A and 5C), and countersunk mounting holes 40 (shown in FIGS. 5A and 5B).

Faceplate 10D is the same as faceplate 10 described in reference to FIGS. 1-2C, and wall 20C is the same as walls 20 and 20A described in reference to FIGS. 1-2C. However, in this embodiment, wall 20D is formed as a separate part that is attached to faceplate 10D. Further, in this embodiment, wall 20D is a horse-shoe shape. Mounting base 38 is attached to a bottom of base 30D such that mounting base 38 makes up a bottom of wall 20D. In this embodiment, mounting base 38 is rectangular. In alternate embodiments, mounting base 38 may be any suitable shape. Mounting holes 40 extend through wall 20D from a top of wall 20D to a bottom of wall 20D. As such, mounting holes 40 extend through tines 32D. Wall 20D can have any number of mounting holes 40. The number of mounting holes 40 may vary depending on the size of faceplate 10D and the type and configuration of the sensor with which faceplate 10D is associated.

Wall 20D is formed separately and attached to faceplate 10D at upstream portion 16D. Mounting base 38 of wall 20D is positioned within a channel (not shown) on faceplate 10D at upstream portion 16D. As such, mounting base 38 assists in positioning wall 20D on faceplate 10D. An entirety of mounting base 38 extends below faceplate 10D such that a bottom of base 30D is flush with the surface, or skin, of an aircraft when faceplate 10D is installed on an aircraft. Mounting base 38 may be unitary, or integral with, base 30D. Fasteners, such as bolts, extend through mounting holes 40 and into faceplate 10D to attach wall 20D to faceplate 10D.

Mounting base 38 and mounting holes 40 allow wall 20D to be attached to faceplate 10D. Mounting base 38 provides structural strength to wall 20D, which is necessary to incorporate mounting holes 40. As a result, wall 20D can be formed separately and attached to faceplate 10D. Thus, wall 20D can be added or removed from faceplate 10D.

The shape and dimensions of walls 20-20D depend on the sensor with which the faceplate is associated and the specific application of the sensor. Walls 20-20D may be shaped to protect an area of concern for a specific sensor in specific environmental conditions. For example, walls 20-20D may be shaped to cover a range of local airflow angles. Walls 20-20D are dimensioned such that ice sheds consistently and predictably given the sensor characteristics and environmental conditions.

DISCUSSION OF POSSIBLE EMBODIMENTS

The following are non-exclusive descriptions of possible embodiments of the present invention.

A wall for a heated faceplate includes a base and tines protruding from the base and spaced from each other, wherein the tines are configured to accumulate ice.

The wall of the preceding paragraph can optionally include, additionally and/or alternatively, any one or more of the following features, configurations and/or additional components:

Grooves positioned between the tines.

The tines are substantially parallel to oncoming airflow.

The tines are configured to shed the accumulated ice.

The tines are configured to accumulate ice in unstable shapes.

The wall is configured to be attached to an upstream portion of the heated faceplate.

The wall is unitary with an upstream portion of the heated faceplate.

The wall is a horse-shoe shape.

The wall is curved.

The wall is straight.

The tines overhang the base in an upstream direction.

The tines have rounded edges.

A faceplate includes an upstream portion; a downstream portion adjacent the upstream portion; and a wall at the upstream portion of the faceplate; the wall including: a base connected to the exterior surface of the faceplate at the upstream portion of the faceplate; and tines protruding from the base, wherein the tines are substantially parallel to oncoming airflow.

The faceplate of the preceding paragraph can optionally include, additionally and/or alternatively, any one or more of the following features, configurations and/or additional components:

The faceplate is a faceplate for an angle of attack sensor.

The faceplate is a faceplate for a flush static plate.

The wall further includes grooves positioned between the tines.

The tines overhang the base in an upstream direction.

The tines are configured to accumulate ice and shed the accumulated ice.

A method for preventing significant ice accumulation on a heated faceplate includes accumulating ice fragments on tines protruding from a base of a wall at an upstream portion of the faceplate; and shedding the ice fragments from the tines.

The method of the preceding paragraph can optionally include, additionally and/or alternatively, any one or more of the following features, configurations and/or additional components:

Abrading ice from a downstream portion of the faceplate when the shedding ice fragments impact the downstream portion of the faceplate.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A wall for a heated faceplate comprising:
   a base configured to connect to an exterior surface of the heated faceplate; and
   tines spaced from each another and protruding out and away from the base so that the tines overhang the base in an upstream direction such that the tines are configured to accumulate ice and shed the accumulated ice.

2. The wall of claim 1, further including grooves positioned between the tines.

3. The wall of claim 1, wherein the tines protrude out and away from the base at an angle such that the tines are substantially parallel to oncoming airflow when the heated faceplate is installed on an aircraft.

4. The wall of claim 1, wherein the tines each have a small width such that the tines are configured to accumulate ice in unstable shapes.

5. The wall of claim 1, wherein the base of the wall is configured to connect to the exterior surface of the heated faceplate at to an upstream portion of the heated faceplate.

6. The wall of claim 1, wherein the wall is unitary with an upstream portion of the heated faceplate.

7. The wall of claim 1, wherein the wall is a horse-shoe shape.

8. The wall of claim 1, wherein the wall is curved.

9. The wall of claim 1, wherein the wall is straight.

10. The wall of claim 1, wherein the tines have rounded edges.

11. A faceplate comprising:
    an interior surface configured to face toward an interior of an aircraft;
    an exterior surface opposite the interior surface; and
    a wall connected to the exterior surface of the faceplate at an upstream portion of the faceplate; the wall including:
        a base connected to the exterior surface of the faceplate at the upstream portion of the faceplate; and
        tines protruding from a top of the base, wherein the tines are substantially parallel to oncoming airflow.

12. The faceplate of claim 11, wherein the wall further includes grooves positioned between the tines.

13. The faceplate of claim 11, wherein the tines overhang the base in an upstream direction.

14. The faceplate of claim 11, wherein the tines are configured to accumulate ice and shed the accumulated ice.

15. A faceplate comprising:
    an upstream portion;
    a downstream portion adjacent the upstream portion; and
    a wall at the upstream portion of the faceplate; the wall including:
        a base connected to an exterior surface of the faceplate at the upstream portion of the faceplate; and
        tines protruding from the base, wherein the tines are substantially parallel to oncoming airflow;
    wherein the faceplate is a faceplate for an angle of attack sensor.

16. A faceplate comprising:
    an upstream portion;
    a downstream portion adjacent the upstream portion; and
    a wall at the upstream portion of the faceplate; the wall including:
        a base connected to an exterior surface of the faceplate at the upstream portion of the faceplate; and
        tines protruding from the base, wherein the tines are substantially parallel to oncoming airflow;
    wherein the faceplate is a faceplate for a flush static plate.

17. A method for preventing significant ice accumulation on a heated faceplate comprising:
    accumulating ice fragments on tines protruding from a base of a wall at an upstream portion of the faceplate, wherein the wall is connected to an exterior surface of the faceplate, the exterior surface being opposite an interior surface that is configured to face toward an interior of an aircraft; and
    shedding the ice fragments from the tines.

18. The method of claim 17, further including abrading ice from a downstream portion of the faceplate when the shedding ice fragments impact the downstream portion of the faceplate.

* * * * *